(12) United States Patent
Arena

(10) Patent No.: US 7,293,920 B2
(45) Date of Patent: Nov. 13, 2007

(54) SELF-ALIGNING BEARING ASSEMBLY CAPABLE OF REACTING RADIAL AND AXIAL LOADS

(75) Inventor: Aldo Arena, Smithtown, NY (US)

(73) Assignee: Northrop Grumman Corporation, Los Angeles, CA (US)

( * ) Notice: Subject to any disclaimer, the term of this patent is extended or adjusted under 35 U.S.C. 154(b) by 108 days.

(21) Appl. No.: 11/080,164

(22) Filed: Mar. 14, 2005

(65) Prior Publication Data

US 2006/0204160 A1    Sep. 14, 2006

(51) Int. Cl.
*F16C 19/49* (2006.01)
(52) U.S. Cl. ..................................... 384/495
(58) Field of Classification Search ............... 384/494, 384/495, 126, 127, 420
See application file for complete search history.

(56) References Cited

U.S. PATENT DOCUMENTS

| 1,832,312 A | 11/1931 | Lutz |
|---|---|---|
| 1,995,408 A | 3/1935 | Wallgren |
| 2,975,007 A | 3/1961 | Zwicker |
| 2,987,351 A | 6/1961 | Aberle |
| 3,009,747 A | 11/1961 | Pitzer |
| 3,476,454 A | 11/1969 | Markey |
| 3,762,240 A | 10/1973 | Adams |
| 5,718,517 A | 2/1998 | Morando |
| 5,828,151 A | 10/1998 | Bustamante et al. |
| 5,885,006 A | 3/1999 | Sheedy |

FOREIGN PATENT DOCUMENTS

JP    61-175313    8/1986

*Primary Examiner*—Lenard A. Footland
(74) *Attorney, Agent, or Firm*—Alan G. Towner, Esq.; Pietragallo Bosick & Gordon, LLP

(57) ABSTRACT

A self-aligning bearing assembly is disclosed which is capable of reacting both radial and axial loads. An inner bearing race is connected to a rotatable shaft that is subjected to such loads. An outer bearing race is installed within a housing and is capable of movement in multiple directions with respect to the housing. The outer bearing race can rotate in planes corresponding to longitudinal sections of the outer race, i.e., rotational displacement. In addition, the outer bearing race can translate with respect to an inner wall of the housing in an axial direction of the housing, i.e., axial displacement. Such movement is enabled by the use of radially displaceable thrust rings which contact the outer bearing race, and control of the geometry of the outer bearing race and inner wall of the housing.

36 Claims, 7 Drawing Sheets

SELF-ALIGNING BEARING ASSEMBLY CAPABLE OF REACTING RADIAL AND AXIAL LOADS

FIELD OF THE INVENTION

The present invention relates to bearing assemblies, and more particularly relates to bearing assemblies that are capable of reacting radial and axial loads in various applications such as in the rotating flight shafts that support the rotodomes of surveillance aircrafts.

BACKGROUND INFORMATION

Bearing assemblies are often used in applications where a rotating shaft is subjected to radial and axial loads. For example, the gearbox and rotating flight shaft of radar-equipped aircraft such as the rotodome of early warning command and control aircraft are subjected to substantial radial loads on the rotodome flight shaft due to air loads acting on the rotodome during flight. In addition, the flight shaft is subjected to substantial axial loads due to the weight of the rotodome and the aerodynamic forces applied during flight on the disk-shaped rotodome. In conventional rotodome gearbox and flight shaft designs, a highly complex bearing system is used, including upper and lower bearing assemblies offset along the length of the shaft from a lower "X" bearing assembly in the rotodome gearbox that is required in order to react the substantial axial loads on the shaft. This arrangement has several drawbacks including substantial wear of the upper and lower pylon bearing assemblies when the flight shaft bends, which causes unwanted walking, rotation at the inner and outer diameters of the bearings that, in turn, causes scoring of the structural support assembly. Other disadvantages of the conventional design include uneven loading of the "X" bearing that results in brinelling of the bearing races and reduced life. The current arrangement also requires time consuming maintenance procedures due to the fact that the flight shaft and gearbox are secured with common fasteners requiring removal of the flight shaft load from the gearbox as a prerequisite for removal and replacement of the gearbox.

The present invention has been developed in view of the foregoing, and to address other deficiencies of prior bearing assembly designs.

SUMMARY OF THE INVENTION

The present invention provides a self-aligning bearing assembly which is capable of reacting both radial and axial loads, as well as moment loads. An inner bearing race is connected to a rotatable shaft that is subjected to such loads. An outer bearing race is installed within a housing and is capable of movement in multiple directions with respect to the housing. The outer bearing race can rotate in planes corresponding to longitudinal sections of the outer race, i.e., "rotational displacement". In addition, the outer bearing race can translate within limits with respect to an inner wall of the housing in an axial direction of the housing, i.e., "axial displacement". Such movement is achieved by controlling the geometry of the outer bearing race and inner wall of the housing, and by the use of radially displaceable thrust rings which contact the outer bearing race.

An aspect of the present invention is to provide a bearing assembly comprising a bearing housing, an outer bearing race and inner bearing race. The inner bearing race can be singular or made up of multiple segments. A portion of a radial outer surface of the outer bearing race contacts an inner wall of the bearing housing. When a radial or bending load is applied to a rotatable shaft connected to the inner race, the axial centerlines of the inner and outer races are displaced with respect to the axial centerline of the bearing housing, causing both rotational displacement and axial displacement of the outer bearing race with respect to the inner wall of the bearing housing.

Another aspect of the present invention is to provide a rotatable shaft and bearing assembly comprising a bearing housing, an outer bearing race disposed in the bearing housing, an inner bearing race disposed radially inside the outer bearing race, and a rotatable shaft connected to the inner bearing race, wherein a radial load applied to the rotatable shaft causes axial displacement of the outer bearing race with respect to the bearing housing.

These and other aspects of the present invention will be more apparent from the following description.

BRIEF DESCRIPTION OF THE DRAWINGS

FIG. 5a illustrates the positions of inner and outer bearing races, and upper and lower thrust rings, within the bearing assembly when a rotating shaft connected to the inner race is aligned with the axial centerline of the bearing assembly housing. FIGS. 5b and 5c illustrate rotational displacement and axial displacement of the bearing races, as well as radial displacements of the thrust rings, when the axis of the rotating shaft is misaligned with respect to the axial centerline of the bearing assembly.

DETAILED DESCRIPTION

Figure 1:
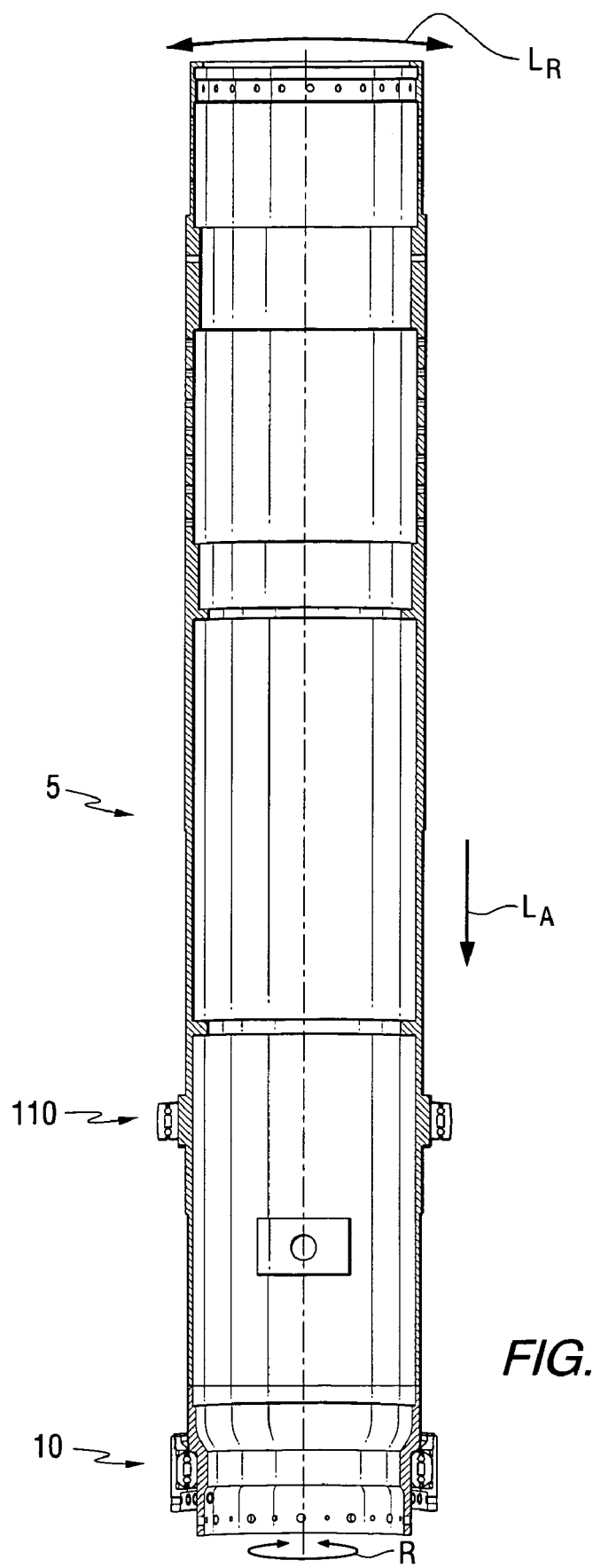
FIG. 1 is a longitudinal sectional view of a rotodome flight shaft and a self-aligning bearing assembly in accordance with an embodiment of the present invention.

FIG. 1 is a longitudinal sectional view of a rotatable shaft 5 connected to a self-aligning bearing assembly 10 in accordance with an embodiment of the present invention. In the embodiment shown in FIG. 1, the rotatable shaft 5 is the rotodome flight shaft of an early warning command and control aircraft. Although a rotodome flight shaft is primarily described herein, it is to be understood that other types of rotatable shafts may be used in association with the self-aligning bearing assembly of the present invention. For example, the rotatable shaft could be part of a jet engine drive shaft, electrical generator drive shaft or the like.

As illustrated in FIG. 1, the rotatable shaft 5 rotates about its longitudinal axis as shown by the arrow R. The rotatable shaft 5 is subjected to a radial load $L_R$ and an axial load $L_A$. Such loads may be generated in various ways. For example, when the rotatable shaft 5 is part of an aircraft rotodome support structure, the radial load $L_R$ may be generated during takeoff, flight and landing of the aircraft due to acceleration, air resistance and deceleration of the aircraft. In this case, the direction of the radial load $L_R$ on the rotatable shaft 5 generally corresponds to either the fore or aft direction of the aircraft. When the rotatable shaft 5 is part of a rotodome support structure, the axial load $L_A$ may be generated from downward forces developed during flight of the aircraft as a result of the slight forward slope of the disk-shaped rotodome. In addition, at least part of the axial load $L_A$ may be generated by the weight of the rotodome. The rotodome weight imposes a significant load factor, particularly during landing and take off as might be the case on catapult and arrestment during carrier operations.

In certain embodiments, it may be desirable to include additional bearing assemblies for the rotatable shaft 5. For example, when the shaft 5 is a rotodome flight shaft, an upper bearing assembly 110 may be connected to the shaft 5, as shown in FIG. 1.

Figure 2:
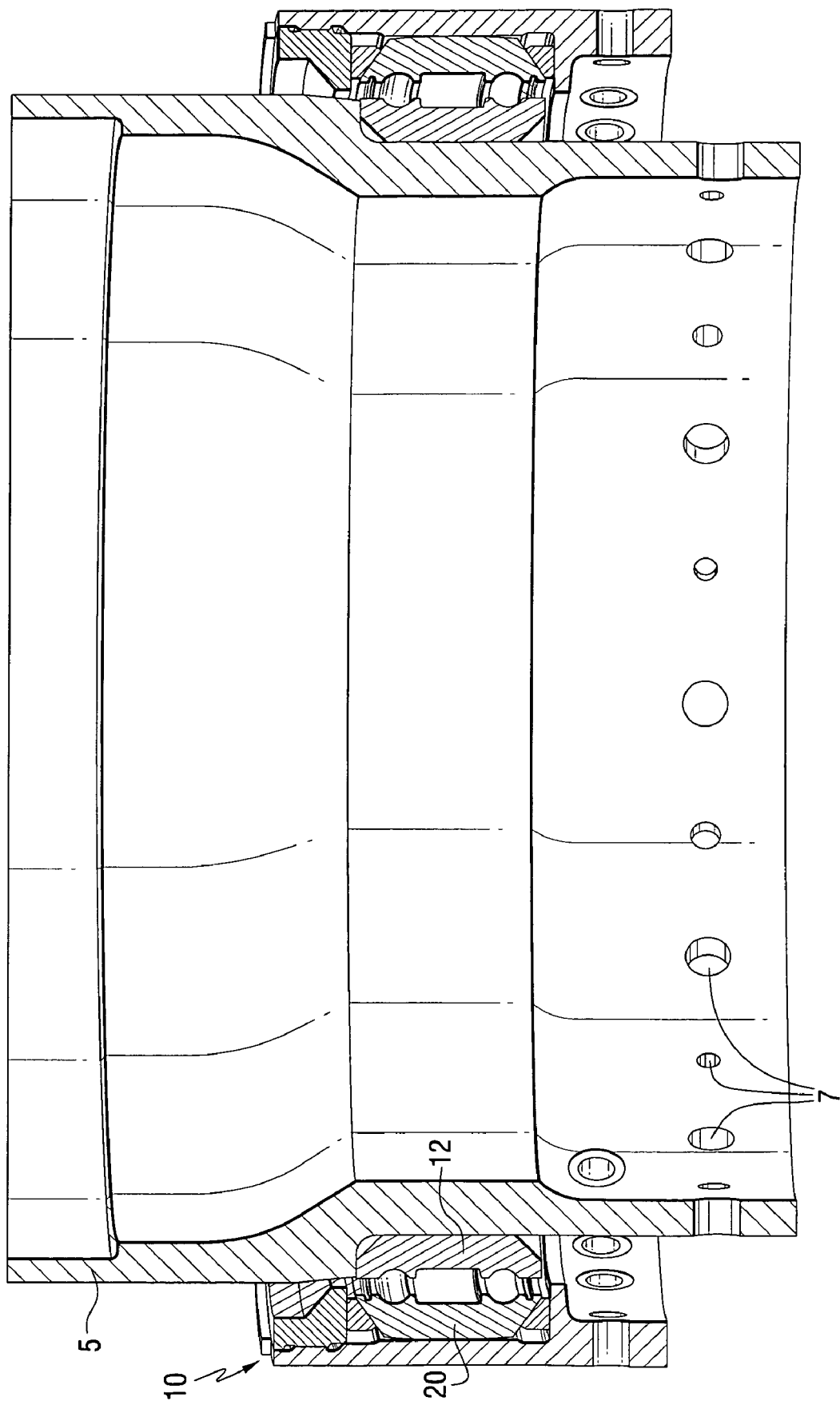
FIG. 2 is a longitudinal sectional view of the lower portion of the rotodome flight shaft and the self-aligning bearing assembly shown in FIG. 1.

As shown in FIG. 2, the lower portion of the rotatable shaft 5 is connected directly or indirectly to an inner race 12 of the self-aligning bearing assembly 10. The bearing assembly 10 also includes an outer race 20. The bottom end of the rotatable shaft 5 may have holes 7 for connection to a drive assembly (not shown). Although holes 7 are shown in FIG. 2, any other suitable means for connection of the rotatable shaft 5 to a drive assembly may be used. The connection between the rotatable shaft 5 and inner race 12 may be of any suitable design, such as vertically oriented fasteners that pass through vertically oriented clearance holes integral to the inner race and engage threaded holes integral to the flight shaft, mechanical fasteners radially disposed to attach a separate collar that traps the bearing inner race between the collar and the lower shoulder of the flight shaft, and the like.

Figure 3:
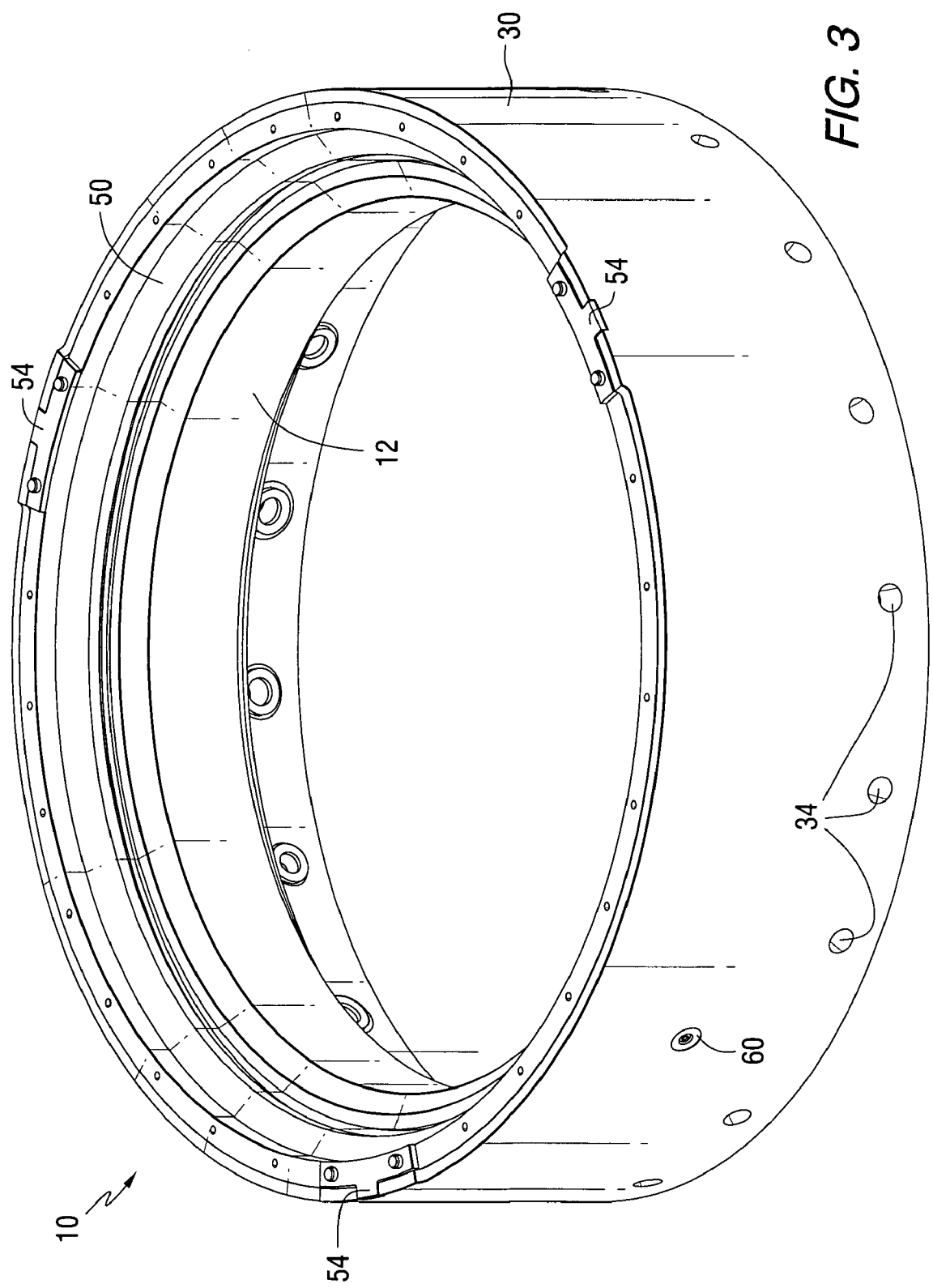
FIG. 3 is an isometric view of a self-aligning bearing assembly in accordance with an embodiment of the present invention.

As shown in FIG. 3, the self-aligning bearing assembly 10 includes a bearing housing 30 within which the inner race 12 is located. As more fully described below, an upper retaining ring 50 and locking tabs 54 secure the various components of the bearing assembly within the housing 30. As also more fully described below, a pin 60 extends through the bearing housing 30 for securing the outer race 20 against rotation. Holes 34 may be provided through the bottom portion of the bearing housing 30 in order to facilitate attachment of the bearing housing to any suitable type of support structure. The connection between the housing 30 of the bearing assembly and the support structure may be of any suitable design, such as holes 34 integral to a flange located on the upper portion of the housing 30, or holes integral to flanges on both upper and lower positions of the bearing housing, which may facilitate access to the mechanical connections.

Figure 4:
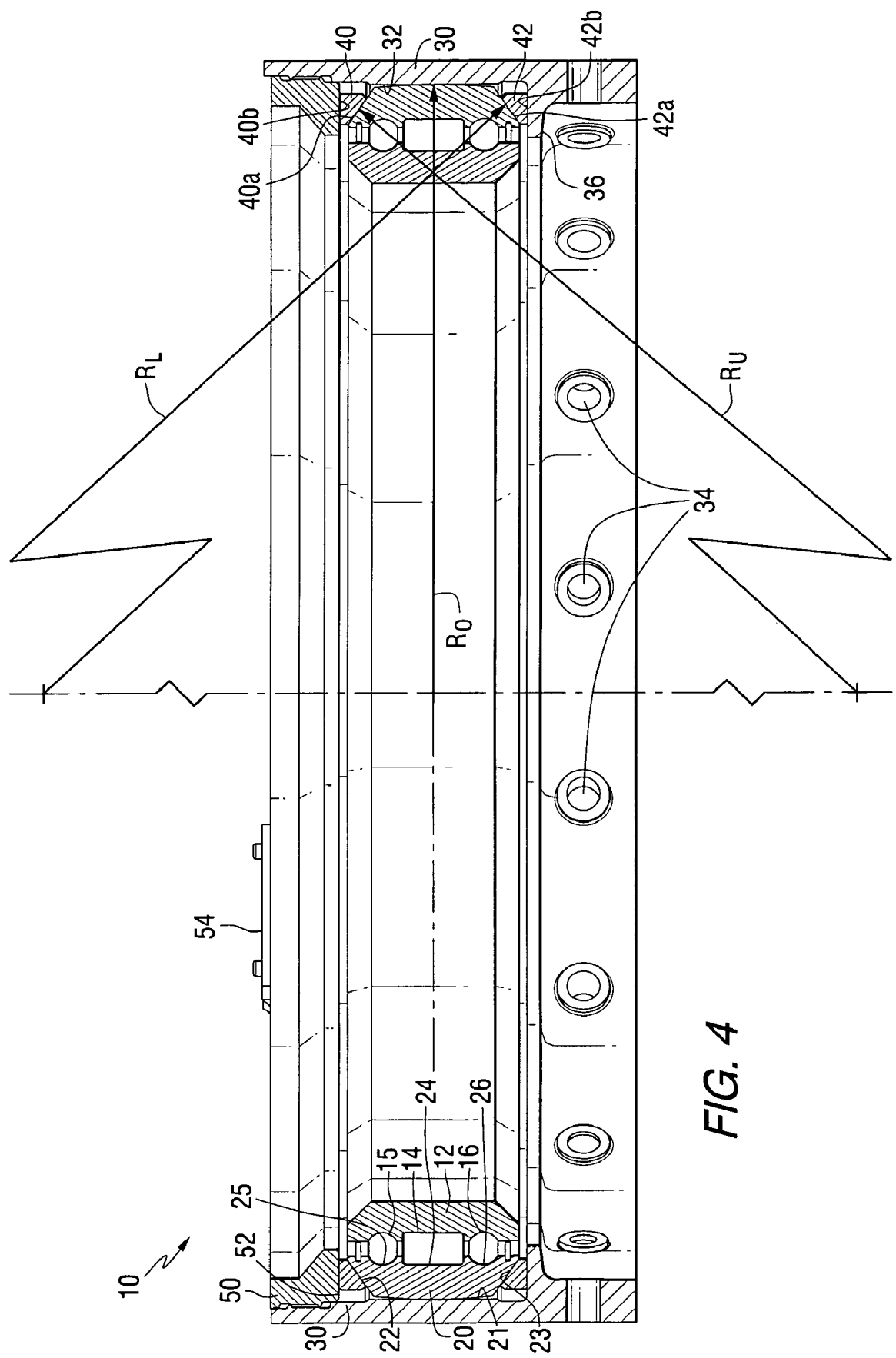
FIG. 4 is a longitudinal sectional view of the self-aligning bearing assembly of FIG. 3.

FIG. 4 is a longitudinal sectional view of the self-aligning bearing assembly 10 including the inner race 12, outer race 20, upper thrust ring 40, lower thrust ring 42 and upper retaining ring 50. The inner race 12 includes a roller bearing channel 14, and upper and lower ball bearing channels 15 and 16, respectively. The outer race 20 has an outer spherical curved surface 21, an upper spherical curved surface 22 and a lower spherical curved surface 23. As shown in FIG. 4, these curved surfaces can be defined by longitudinal sections taken through the outer bearing race 20. The outer race 20 includes a roller bearing channel 24, and upper and lower ball bearing channels 25 and 26, respectively. Although not shown in FIG. 4, any suitable number and size of roller bearings may be provided in opposing channels 14 and 24, and any suitable number and size of ball bearings may be provided in opposing channels 15 and 25, and opposing channels 16 and 26. Although three bearing channels are shown in FIG. 4, any other desirable number and type of ball bearing and/or roller bearing channels may be used. The rollers and ball bearings used are well known and any configuration may be used, such as angular contact ball bearings, x-type ball bearings and crowned or tapered rollers.

As shown in FIG. 4, the bearing housing 30 includes an inner wall 32 having a cylindrical shape against which a portion of the outer curved surface 21 of the outer race 20 is contacted. A lower retaining rim 36 extends radially inward near the bottom of the housing 30. An upper retaining ring 50 helps retain the outer race 20 and other components of the bearing assembly within the housing 30. The upper retaining ring 50 is secured to the housing 30 by locking tabs 54.

As illustrated in FIG. 4, an upper thrust ring 40 is positioned against the upper curved surface 22 of the outer race 20 and against a thrust surface 52 of the upper retaining ring 50. A lower thrust ring 42 is positioned against the lower curved surface 23 of the outer race 20 and against a thrust surface of the lower retaining rim 36. As more fully described below, the upper and lower thrust rings 40 and 42 move radially in opposite directions within the bearing housing 30 when the rotating shaft 5 connected to the inner race 12 is dislocated due to radial or bending loads $L_R$ applied thereto. As illustrated in FIG. 4, in a preferred embodiment of the present invention, the bearing assembly is provided with sliding clearances between components, as more fully described below.

As shown in FIG. 4, the outer spherical curved surface 21 of the outer race 20, defined by a longitudinal section taken through the outer race, has a radius of curvature $R_O$ that has its center on the axial centerline of the bearing. This central axis coincides with the center axis of the rotating shaft 5. The radius of curvature $R_O$ is in close proximity to the inner cylindrical surface 32 of the housing 30 while allowing rotational clearance between the center sphere and the cylindrical surface 32. The upper curved surface 22 of the outer race 20 has a spherical radius of curvature $R_U$, while the lower curved surface 23 of the outer race 20 has a spherical radius of curvature of $R_L$. In accordance with an embodiment of the present invention, the radius of curvature $R_O$ of the outer surface 21 is less than the radius of curvature $R_U$ of the upper curved surface 22 and the radius of curvature $R_L$ of the lower curved surface 23. The upper and lower radii of curvature $R_U$, $R_L$ are typically 1.05 to 3.5 times greater than the outer radius of curvature $R_O$, i.e., $R_U$, $R_L$:$R_O$ is from about 1.05:1 to about 3.5:1. The upper surface 22 of the outer race 20 defines a spherical surface with its center on the axis of rotation of the bearing. However, the center of the sphere defined by the spherical radius $R_U$ of the upper surface 22 is vertically disposed below the spherical radius $R_O$ of the outer surface 21. Similarly, the lower surface 23 of the outer race 20 defines a spherical surface with its center on the axis of rotation of the bearing. However, the center of the sphere defined by the spherical radius $R_L$ of the lower surface 23 is vertically disposed above the spherical radius $R_O$ of the outer surface 21.

In one embodiment, the radius of curvature $R_U$ of the upper curved surface 22 is the same as the radius of curvature $R_L$ of the lower curved surface 23 of the outer race 20. While this feature is not a necessity, provisions would have to be made in the configuration of the bearing assembly if the the radius of curvature $R_U$ of the upper curved surface 22 is not the same as the radius of curvature $R_L$ of the lower curved surface 23.

The magnitude of the vertical displacements of the upper and lower spherical surfaces 22 and 23 may be influenced by the magnitude of the axial load to be reacted by the bearing. The smaller the vertical disposition between each of the upper and lower spheres (having radii $R_U$ and $R_L$, respectively) to the center sphere (having radius $R_O$), the smaller the projected area available to react axial loads. Conversely, the greater the vertical disposition between the upper and lower sphere to the center sphere, the greater the projected area available to react axial loads.

As shown in FIG. 4, the upper thrust ring 40 has an outer race contact surface 40a which contacts the upper curved surface 22 of the outer race 20. The outer race contact surface 40a of the upper thrust ring 40 may have a shape which substantially matches the curvature of the upper curved surface 22 of the outer race 20. However, it may be preferred to provide a substantially straight conical shape for the outer race contact surface 40a in order to reduce and simplify fabrication of the upper thrust ring 40. In this case, only a limited portion of the outer race contact surface 40a may touch the upper curved surface 22 of the outer race 20. The upper thrust ring 40 also has an upper retaining ring contact surface 40b which contacts the thrust surface 52 of the upper retaining ring 50. The upper retaining ring contact surface 40b may be substantially flat in order to conform with the substantially flat thrust surface 52.

The lower thrust ring 42 preferably has a shape and size that mirrors the upper thrust ring 40. Thus, the lower thrust ring 42 has an outer race contact surface 42a which contacts the lower curved surface 23 of the outer race 20. The lower thrust ring 42 also has a lower retaining rim contact surface 42b which contacts and slides radially against the thrust surface of the lower retaining rim 36.

The various components of the bearing assembly 10 may be made of any suitable materials. For example, the housing 30 may be made of steel, bronze, titanium or aluminum, while the inner and outer bearing races 12 and 20 may be made of steel, bronze, titanium or aluminum. The upper and lower thrust rings 40 and 42 may be made of any suitable material such as steel or the like. In one embodiment, the outer race contact surfaces 40a and 42a and/or the retaining ring or rim contact surfaces 40b and 42b of the thrust rings 40 and 42 may be coated with a lubricant and/or friction reducing material, such as polytetrafluoroethylene or the like.

Figure 5C:
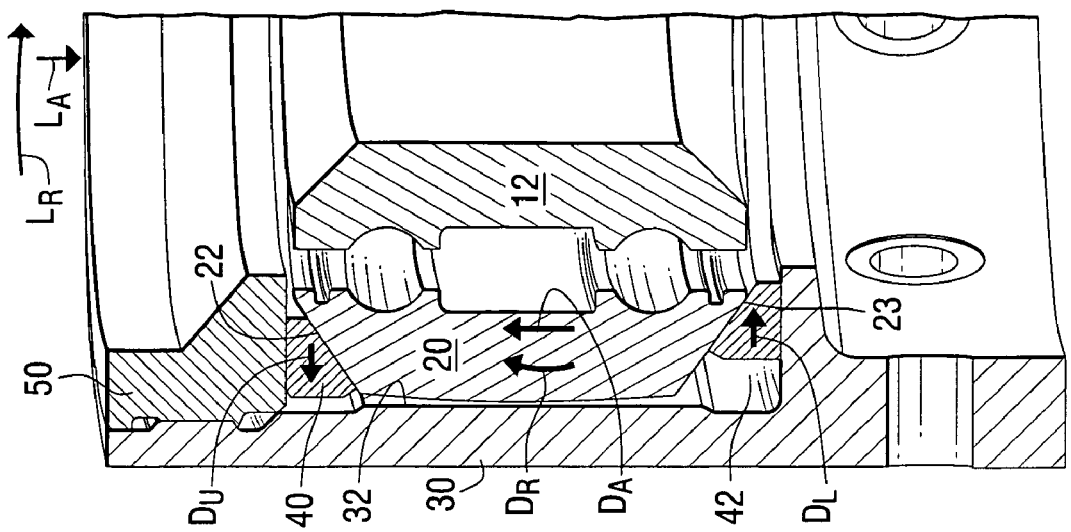
FIGS. 5a-5c are isometric longitudinal sectional views showing a portion of a self-aligning bearing assembly in accordance with an embodiment of the present invention.
Figure 5B:
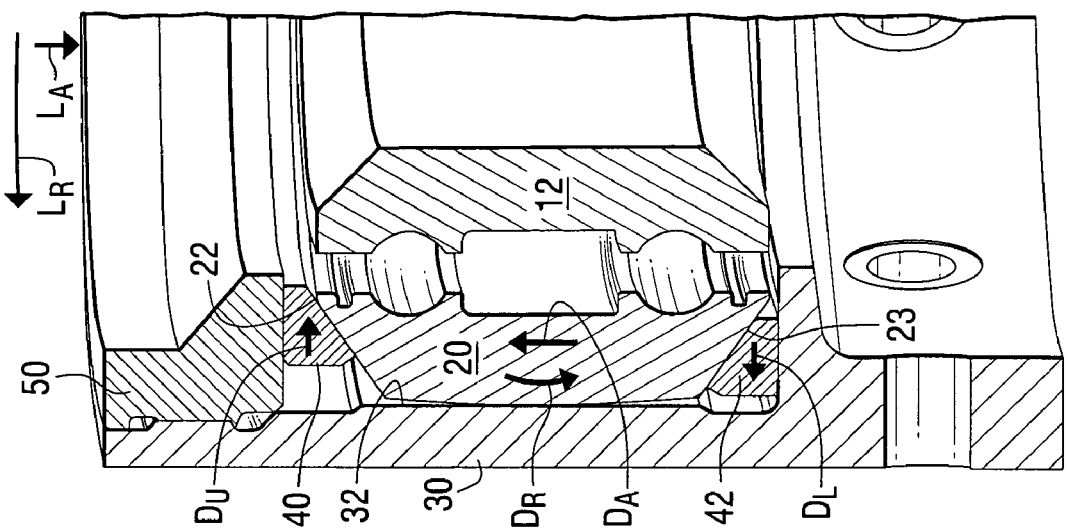
Figure 5A:
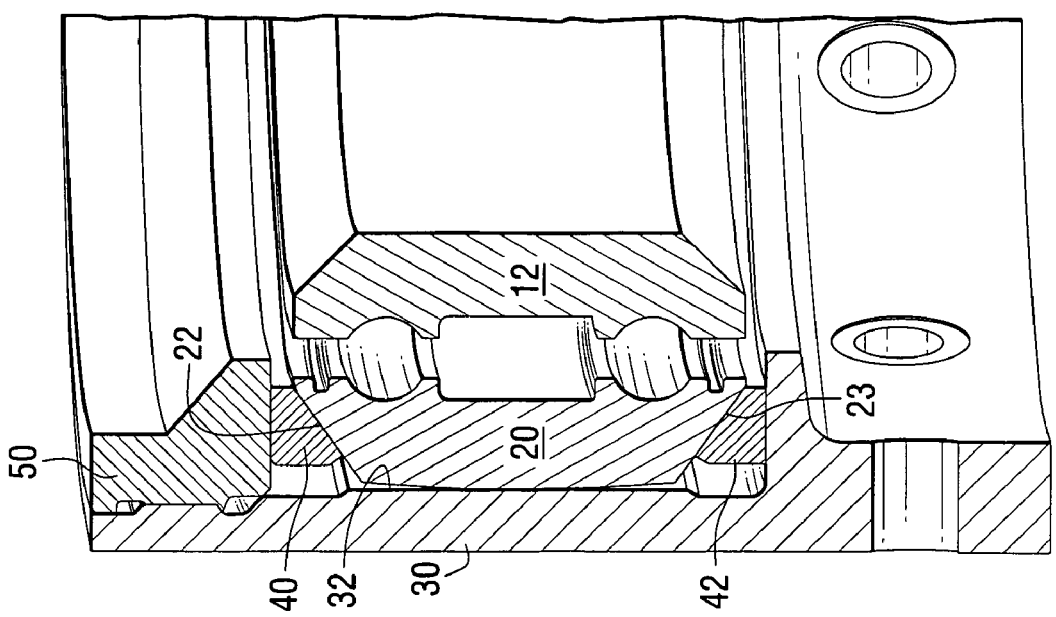

FIG. 5a illustrates the positions of the inner and outer bearing races 12 and 20, and the positions of the upper and lower thrust rings 40 and 42, within the bearing housing 30 when the rotating shaft (not shown) connected to the inner race 12 is aligned with the axial centerline of the bearing housing 30. In FIG. 5a, the inner and outer races 12 and 20 are positioned within the bearing housing 30 such that all of their axial centerlines are aligned.

FIGS. 5b and 5c illustrate rotational displacements and axial displacements of the bearing races 12 and 20, as well as radial displacements of the thrust rings 40 and 42, when the axis of the rotating shaft connected to the inner race 12 is misaligned with respect to the axial centerline of the bearing housing 30 and a downward axial load $L_A$ is applied on the shaft. In FIGS. 5b and 5c, the axial centerlines of the inner and outer races 12 and 20 are misaligned with respect to the axial centerline of the bearing housing 30 due to radial or bending movement in the direction $L_R$ of the rotating shaft to which the inner race 12 is attached. In FIG. 5b, the upper portion of the rotating shaft (not shown) is radially displaced in a leftward or counterclockwise direction shown by the arrow $L_R$, while in FIG. 5c the upper portion of the rotating shaft (not shown) is radially displaced in a rightward or clockwise direction shown by the arrow $L_R$.

In FIG. 5b, under load conditions where the axial load $L_A$ on the shaft is in a downward direction and the shaft is displaced in a counterclockwise direction $L_R$, the outer race 20 undergoes counterclockwise rotational displacement $D_R$ in relation to the straight cylindrical inner wall surface 32 of the bearing housing 30. In addition, due to the downward axial force $L_A$ on the shaft, the outer race 20 undergoes an upward axial displacement $D_A$ with respect to the straight cylindrical inner wall surface 32 of the bearing housing 30. The upward axial displacement $D_A$ is caused by a downward vertical displacement of the center of the sphere defined by the lower spherical surface 23 of the outer race 20, which has the radius $R_L$ shown in FIG. 4. Axial loads push the lower surface 23 of the outer race 20 against the outer race contact surface 42a of the lower thrust ring 42. When the center of the sphere defined by radius $R_L$ tries to move in a downward direction, the center of the sphere defined by the radius $R_O$ of the outer race surface 21 (shown in FIG. 4) will be lifted up since the thrust ring 42 is in immediate contact with respect to the lower surface 23. It follows that when the shaft bends, e.g., due to aerodynamic loading, and the axis of rotation of the shaft misaligned with respect to the housing 30, the center of the sphere defined by the radius $R_L$ of the lower surface 23 of the outer race 20 will move radially from its undeflected position. Since the thrust ring 42 is always in immediate contact with respect to the lower surface 23 it will be displaced radially in the same direction as the the center of the sphere defined by the radius $R_L$ by virtue of the fact that surface 23 is nested in the conical shape of surface 42. Similarly, the center of the sphere defined by the radius $R_U$ of the upper surface 22 of the outer race 20 will displace in equal but opposite direction to that of surface 23. As a consequence, since the thrust ring 40 is always in immediate contact with respect to the upper surface 22, it will be displaced radially in the same direction as the the center of the sphere defined by the radius $R_U$ by virtue of the fact that surface 22 is nested in the conical shape of surface 40.

FIG. 5c illustrates what happens when the rotating shaft is radially displaced in a rightward or clockwise direction shown by the arrow $L_R$, i.e., in the opposite direction compared with FIG. 5b. In FIG. 5c, the outer race 20 undergoes clockwise rotational displacement $D_R$ in relation to the straight cylindrical inner wall surface 32 of the bearing housing 30. In addition, due to the downward axial force $L_A$ on the shaft, the outer race 20 undergoes an upward axial displacement $D_A$ with respect to the straight cylindrical inner wall surface 32 of the bearing housing 30. The upward axial displacement $D_A$ is caused by a downward vertical displacement of the center of the sphere defined by radius $R_L$. Axial loads push the lower surface 23 of the outer race 20 against the outer race contact surface 42a of the lower thrust ring 42. When the center of the sphere defined by radius $R_L$ tries to move in a downward direction, the center of the sphere defined by radius $R_O$ will be lifted up since the thrust ring 42 is in immediate contact with respect to the lower surface 23. It follows that when the flight shaft bends due to aerodynamic loading, and the axis of rotation of the lower portion of the flight shaft misaligned with respect to the housing 30, the center of the sphere defined by the radius $R_L$ of the lower surface 23 of the outer race 20 will move radially from its undeflected position. Since the thrust ring 42 is always in immediate contact with respect to the lower surface 23 it will be displaced radially in the same direction as the the center of the sphere by virtue of the fact that surface 23 is nested in the conical shape of surface 42. Similarly, the center of the sphere defined by the radius $R_U$ of the upper surface 22 of the outer bearing 20 will displace in equal but opposite direction to that of surface 23. As a consequence, since the thrust ring 40 is always in immediate contact with respect to the upper surface 22, it will be displaced radially in the same direction as the the center of the sphere by virtue of the fact that surface 22 is nested in the conical shape of surface 40.

FIGS. 5b and 5c illustrate the rotational and axial displacements $D_R$ and $D_A$ which occur when a downward axial load $L_A$ is applied through the shaft to which the inner race 12 is connected. As shown in both FIGS. 5b and 5c, the axial displacement $D_A$ is in an upward direction when the axial load $L_A$ is downward. Alternatively, if the axial load $L_A$ is in an upward direction, the axial displacement $D_A$ would be in a downward direction. In this case, when the axial load $L_A$ is upward, the direction of the arrows $D_A$ would be switched to a downward direction in FIGS. 5b and 5c, while the directions of the rotational displacement arrows $D_R$ would remain the same.

Figure 6:
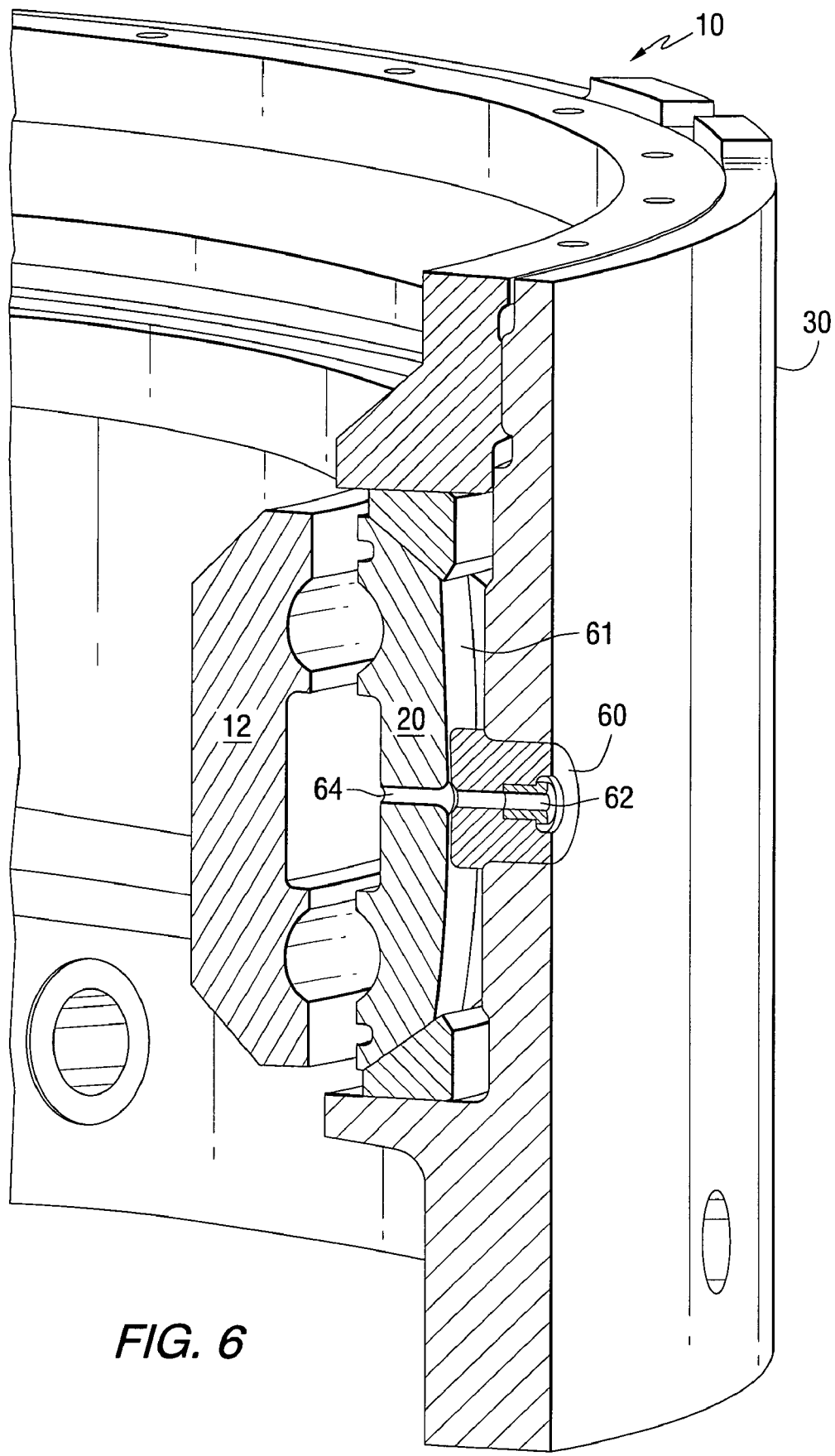
FIG. 6 is a longitudinal sectional view of a portion of a self-aligning bearing assembly showing an anti-rotation pin and a lubricant port extending through the housing of the bearing assembly in accordance with an embodiment of the present invention.

FIG. 6 illustrates details of the pin 60 which extends through the bearing housing 30. The pin 60 has a generally cylindrical shape with a slightly larger diameter portion extending radially inward from the housing 30. This portion of the pin 60 is received in a groove 61 on the outside of the outer race 20, which prevents rotation of the outer race 20 around its central axis with respect to the housing, while allowing the displacements $D_R$ and $D_A$ illustrated in FIGS. 5b and 5c. Further, the pin 60 may rotate about its axis due to the rotational and axial displacements $D_R$ and $D_A$ of the outer race 20. Thus, the pin 60 can slide in the groove 61 but prevents the outer race 20 from rotating around its central axis within the housing 30. The pin 60 includes a lubricant port having a grease fitting 62. The grease fitting 62 may be of any known design and may be used in conjunction with the application of conventional high pressure grease guns for the injection of a lubricating grease to the rotating elements of the bearing assembly. The port extending through the pin 60 allows lubricating grease to be injected into the housing 30. A lubricant hole 64 is provided through the outer bearing race 20 in order to allow access of the lubricant to the bearing channels of the inner and outer races 12 and 20. In a preferred embodiment, two pins 60 are located at diametrically opposed locations around the circumference of the bearing housing 30. The particular circumferential locations of the pins 60 may be selected based on the likely radial loading direction of the rotatable shaft 5. For example, when the shaft 5 is a rotodome flight shaft which is typically radially loaded in either the fore or aft direction of the aircarft, the pins 60 may be positioned circumferentially on the sides of the shaft, i.e., rotated 90 degrees from the fore/aft direction of the aircraft. In this manner, misalignment of the pins 60 with the lubricant hole 64 through the outer race 20 may be minimized. Further, contact surfaces 21 and 32 are maximized in the direction of highest load.

Figure 7:
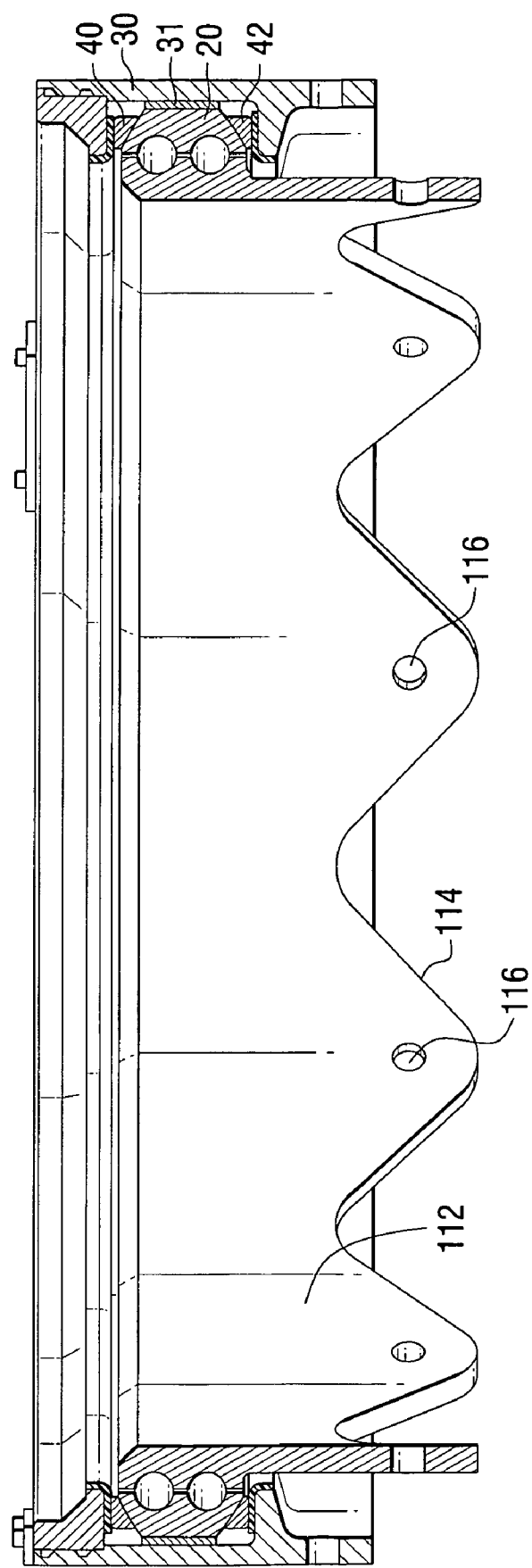
FIG. 7 is a longitudinal sectional view of a self-aligning bearing assembly having an extended inner race with a scalloped lower surface in accordance with an embodiment of the present invention.

FIG. 7 illustrates an alternative inner bearing race configuration for a self-aligning bearing assembly in accordance with an embodiment of the present invention. In this embodiment, the inner race 112 has an extended lower portion having a scalloped edge 114. Holes 116 are provided through the lower extended portions of the scalloped edge. The holes 116 and scalloped edge 114 configuration may be connected to a drive assembly (not shown). The embodiment shown in FIG. 7 also includes a sleeve 31 inside the bearing housing 30 which contacts the outer race 20.

Whereas particular embodiments of this invention have been described above for purposes of illustration, it will be evident to those skilled in the art that numerous variations of the details of the present invention may be made without departing from the invention as defined in the appended claims.

The invention claimed is:

1. A bearing assembly comprising:
   a bearing housing having an axial centerline and an inner wall; and
   an outer bearing race having an axial centerline and an outer surface, wherein a portion of the outer surface of the outer bearing race contacts the inner wall of the bearing housing, and displacement of the axial centerline of the outer race with respect to the axial centerline of the bearing housing under an axial load applied to the outer race causes rotational displacement and axial displacement of the outer surface of the outer bearing race with respect to the inner wall of the bearing housing, wherein the axial displacement of the outer surface of the outer bearing race is in a direction opposite to the applied axial load.

2. The bearing assembly of claim 1, wherein at least a portion of the inner wall of the bearing housing contacting the outer surface of the outer bearing race is cylindrical.

3. The bearing assembly of claim 1, wherein the inner wall of the bearing housing is integrally formed with the bearing housing.

4. The bearing assembly of claim 1, wherein the outer surface of the outer bearing race is spherical and has a center on the axial centerline of the outer race.

5. The bearing assembly of claim 1, wherein the displacement of the axial centerline of the outer bearing race with respect to the axial centerline of the bearing housing causes a different portion of the outer surface of the outer bearing race to contact the inner wall of the bearing housing.

6. The bearing assembly of claim 1, wherein the displacement of the axial center of the outer bearing race with respect to the axial center of the bearing housing causes a different portion of the inner surface of the bearing housing to contact the outer surface of the outer bearing race.

7. The bearing assembly of claim 1, further comprising an upper thrust ring contacting an upper surface of the outer bearing race, and a lower thrust ring contacting a lower surface of the outer bearing race.

8. The bearing assembly of claim 7, wherein the upper and lower thrust rings are radially displaceable with respect to the axial centerline of the bearing housing.

9. The bearing assembly of claim 8, wherein the radial displacements of the upper and lower thrust rings are in opposite radial directions.

10. The bearing assembly of claim 7, wherein the upper and/or lower surfaces of the outer bearing race are spherically curved along a longitudinal section of the outer bearing race.

11. The bearing assembly of claim 10, wherein the spherically curved upper and lower surfaces of the outer bearing race have substantially the same radius of curvature.

12. The bearing assembly of claim 10, wherein the outer surface of the outer bearing race is spherically curved along a longitudinal section of the outer bearing race.

13. The bearing assembly of claim 12, wherein the radius of curvature of the outer surface of the outer bearing race defines a sphere with a plane of symmetry contacting the inner surface of the bearing housing.

14. The bearing assembly of claim 12, wherein the spherically curved outer surface of the outer bearing race has a radius of curvature less than a radius of curvature of the curved upper or lower surfaces of the outer bearing race.

15. The bearing assembly of claim 14, wherein the radii of curvature of each of the curved upper and lower surfaces of the outer bearing race are from about 1.05 to about 3.5 times greater than the radius of curvature of the curved outer surface of the outer bearing race.

16. The bearing assembly of claim 10, wherein the upper and lower thrust rings have surfaces contacting the outer bearing race which are curved along a longitudinal section of the thrust rings.

17. The bearing assembly of claim 7, wherein the bearing housing comprises a lower retaining rim, and the lower thrust ring is radially slidable in the housing against the lower retaining rim.

18. The bearing assembly of claim 7, further comprising an upper retaining ring installed in the bearing housing, wherein the upper thrust ring is radially slidable in the housing against the upper retaining ring.

19. The bearing assembly of claim 1, further comprising at least one pin extending radially inward from the inner wall of the bearing housing and contacting the outer bearing race, wherein the pin prevents the outer bearing race from rotating around its axial centerline within the bearing housing.

20. The bearing assembly of claim 19, wherein the pin is slidably engaged in a groove in the outer race which is substantially parallel with the axial centerline of the outer race.

21. The bearing assembly of claim 19, wherein the pin includes a lubricant port extending therethrough.

22. The bearing assembly of claim 1, further comprising an inner bearing race disposed radially inside the outer bearing race.

23. The bearing assembly of claim 22, wherein each of the inner and outer bearing races comprise at least one oppositely disposed bearing channel.

24. The bearing assembly of claim 23, wherein the at least one bearing channel is structured and arranged to receive ball bearings.

25. The bearing assembly of claim 23, wherein the at least one bearing channel is structured and arranged to receive roller bearings.

26. The bearing assembly of claim 22, wherein each of the inner and outer bearing races comprise at least two oppositely disposed bearing channels.

27. The bearing assembly of claim 26, wherein the oppositely disposed bearing channels are structured and arranged to receive ball bearings and/or roller bearings.

28. The bearing assembly of claim 22, further comprising at least one lubricant port extending through the bearing housing and communicating with the outer bearing race and the inner bearing race.

29. The bearing assembly of claim 28, wherein the at least one lubricant port extends through a pin which prevents the outer bearing race from rotating around its axial centerline within the bearing housing.

30. The bearing assembly of claim 22, wherein the inner bearing race is structured and arranged for attachment to a rotatable shaft.

31. The bearing assembly of claim 30, wherein the inner bearing race is structured and arranged for attachment near a lower end of the rotatable shaft.

32. The bearing assembly of claim 30, wherein the rotatable shaft is a rotodome flight shaft.

33. A bearing assembly comprising:
a bearing housing having an axial centerline and an inner wall;
an outer bearing race having an axial centerline and an outer surface, wherein a portion of the outer surface of the outer bearing race contacts the inner wall of the bearing housing, and displacement of the axial centerline of the outer race with respect to the axial centerline of the bearing housing causes rotational displacement and axial displacement of the outer surface of the outer bearing race with respect to the inner wall of the bearing housing;
an upper thrust ring contacting an upper surface of the outer bearing race; and
a lower thrust ring contacting a lower surface of the outer bearing race, wherein the upper and lower thrust rings are radially displaceable with respect to the axial centerline of the bearing housing.

34. A bearing assembly comprising:
a bearing housing having an axial centerline and an inner wall;
an outer bearing race having an axial centerline and an outer surface, wherein a portion of the outer surface of the outer bearing race contacts the inner wall of the bearing housing, and displacement of the axial centerline of the outer race with respect to the axial centerline of the bearing housing causes rotational displacement and axial displacement of the outer surface of the outer bearing race with respect to the inner wall of the bearing housing; and
at least one pin extending radially inward from the inner wall of the bearing housing and contacting the outer bearing race, wherein the pin prevents the outer bearing race from rotating around its axial centerline within the bearing housing and the pin includes a lubricant port extending therethrough.

35. A bearing assembly comprising:
a bearing housing having an axial centerline and an inner wall;
an outer bearing race having an axial centerline and an outer surface, wherein a portion of the outer surface of the outer bearing race contacts the inner wall of the bearing housing, and displacement of the axial centerline of the outer race with respect to the axial centerline of the bearing housing causes rotational displacement and axial displacement of the outer surface of the outer bearing race with respect to the inner wall of the bearing housing;
an inner bearing race disposed radially inside the outer bearing race; and
at least one lubricant port extending through the bearing housing and communicating with the outer bearing race and the inner bearing race.

36. A bearing assembly comprising:
a bearing housing having an axial centerline and an inner wall;
an outer bearing race having an axial centerline and an outer surface, wherein a portion of the outer surface of the outer bearing race contacts the inner wall of the bearing housing, and displacement of the axial centerline of the outer race with respect to the axial centerline of the bearing housing causes rotational displacement and axial displacement of the outer surface of the outer bearing race with respect to the inner wall of the bearing housing; and
an inner bearing race disposed radially inside the outer bearing race, wherein the inner bearing race is structured and arranged for attachment to a rotodome flight shaft.

* * * * *

UNITED STATES PATENT AND TRADEMARK OFFICE
CERTIFICATE OF CORRECTION

PATENT NO. : 7,293,920 B2
APPLICATION NO. : 11/080164
DATED : November 13, 2007
INVENTOR(S) : Aldo Arena It is certified that error appears in the above-identified patent and that said Letters Patent is hereby corrected as shown below:

Column 6, Line 28 should read
It follows that when the shaft bends, e.g., due to aerodynamic loading, and the axis of rotation of the shaft misaligns with respect to the housing 30, the center of the sphere defined by the radius $R_L$ of the lower surface 23 of of the outer race 20 will move radially from its undeflected position.

Column 6, Line 64 should read
It follows that when the flight shaft bends due to aerodynamic loading, and the axis of rotation of the lower portion of the flight shaft misaligns with respect to the housing 30, the center of the sphere defined by the radius $R_L$ of the lower surface 23 of the outer race 20 will move radially from its undeflected position.

Signed and Sealed this

Ninth Day of December, 2008

JON W. DUDAS
*Director of the United States Patent and Trademark Office*